US011939715B2

(12) United States Patent
Sunaoshi

(10) Patent No.: US 11,939,715 B2
(45) Date of Patent: Mar. 26, 2024

(54) LIQUID DISCHARGE DEVICE, LIQUID DISCHARGE APPARATUS, AND DYEING APPARATUS

(71) Applicant: Masayuki Sunaoshi, Ibaraki (JP)

(72) Inventor: Masayuki Sunaoshi, Ibaraki (JP)

(73) Assignee: RICOH COMPANY, LTD., Tokyo (JP)

(*) Notice: Subject to any disclaimer, the term of this patent is extended or adjusted under 35 U.S.C. 154(b) by 1058 days.

(21) Appl. No.: 16/714,839

(22) Filed: Dec. 16, 2019

(65) Prior Publication Data

US 2020/0208317 A1 Jul. 2, 2020

(30) Foreign Application Priority Data

Dec. 28, 2018 (JP) ................................ 2018-248200

(51) Int. Cl.

| | |
|---|---|
| ***D06B 1/02*** | (2006.01) |
| ***B41J 3/407*** | (2006.01) |
| ***B41J 19/04*** | (2006.01) |
| ***B41J 25/00*** | (2006.01) |
| ***D06B 11/00*** | (2006.01) |

(52) U.S. Cl.

CPC ................ *D06B 1/02* (2013.01); *B41J 19/04* (2013.01); *B41J 25/003* (2013.01); *D06B 11/0023* (2013.01); *B41J 3/4078* (2013.01); *D06B 2700/09* (2013.01)

(58) Field of Classification Search

CPC .. D06B 1/02; D06B 11/0023; D06B 2700/09; B41J 19/04; B41J 25/003; B41J 3/4078; B41J 19/202; B41J 2202/20; D05C 11/24

USPC ........................................................... 68/200

See application file for complete search history.

(56) References Cited

U.S. PATENT DOCUMENTS 5,388,919 A 2/1995 Kimura et al.
5,880,757 A * 3/1999 Ta ......................... B41J 2/2132 347/41
6,076,983 A * 6/2000 Stein ...................... B41J 19/202 400/120.16
6,116,728 A * 9/2000 Miyake ................ B41J 11/0022 347/102

(Continued)

FOREIGN PATENT DOCUMENTS

EP 1674279 A1 6/2006
EP 3275675 A1 1/2018

(Continued)

OTHER PUBLICATIONS

Extended European Search Report dated Jun. 4, 2020, issued in European Patent Application No. 19211125.0, 10 pages.

(Continued)

*Primary Examiner* — David G Cormier
*Assistant Examiner* — Thomas Bucci
(74) *Attorney, Agent, or Firm* — XSENSUS LLP

(57) ABSTRACT

A liquid discharge apparatus includes a liquid discharge head including a nozzle face in which a nozzle is formed and configured to discharge a liquid, a carriage on which the liquid discharge head is mounted, and a guide shaft configured to hold the carriage movably. The liquid discharge apparatus further includes a driver configured to move the carriage, and a coupling between the carriage and the driver. The coupling is disposed on an axis of the guide shaft in a direction orthogonal to the axis of the guide shaft.

8 Claims, 10 Drawing Sheets

(56) References Cited

U.S. PATENT DOCUMENTS

| | | | | |
|---|---|---|---|---|
| 9,586,424 | B2 * | 3/2017 | Campbell | B41J 25/003 |
| 2004/0081502 | A1 * | 4/2004 | Williams | B41J 19/00 400/283 |
| 2006/0132529 | A1 * | 6/2006 | Verhoest | B41J 25/003 347/19 |
| 2006/0139400 | A1 | 6/2006 | Nellen | |
| 2011/0254896 | A1 | 10/2011 | Ferrarotti et al. | |
| 2012/0147094 | A1 * | 6/2012 | Hagiwara | B41J 25/003 29/890.1 |
| 2014/0313250 | A1 * | 10/2014 | Teraji | B41J 25/003 347/9 |
| 2015/0091958 | A1 * | 4/2015 | Terada | B41J 25/00 347/9 |
| 2015/0165799 | A1 | 6/2015 | Lutz | |
| 2016/0375707 | A1 * | 12/2016 | Elferink | B41J 29/02 347/40 |
| 2017/0057260 | A1 * | 3/2017 | Ueda | B41J 25/003 |
| 2017/0165960 | A1 | 6/2017 | Sunaoshi et al. | |
| 2017/0165987 | A1 * | 6/2017 | Hamano | B41J 29/04 |
| 2017/0313108 | A1 | 11/2017 | Profaca et al. | |

FOREIGN PATENT DOCUMENTS

| | | | |
|---|---|---|---|
| JP | S49-51123 | U | 5/1974 |
| JP | H02-30574 | A | 1/1990 |
| JP | H06-091896 | A | 4/1994 |
| JP | 6-299458 | | 10/1994 |
| JP | 6-304359 | | 11/1994 |
| JP | 6-305129 | | 11/1994 |
| JP | H09-146184 | A | 6/1997 |
| JP | 2002-337415 | | 11/2002 |
| JP | 2004-017314 | A | 1/2004 |
| JP | 2004-090493 | A | 3/2004 |
| JP | 2006-231547 | | 9/2006 |
| JP | 2007-276288 | A | 10/2007 |
| JP | 2017-109487 | | 6/2017 |
| NL | 2008063 | C2 | 7/2013 |

OTHER PUBLICATIONS

Office Action dated Aug. 9, 2022 in Japanese Patent Application No. 2018-248200, 3 pages.

* cited by examiner

103

LIQUID DISCHARGE DEVICE, LIQUID DISCHARGE APPARATUS, AND DYEING APPARATUS

CROSS-REFERENCE TO RELATED APPLICATION

This patent application is based on and claims priority pursuant to 35 U.S.C. § 119(a) to Japanese Patent Application No. 2018-248200, filed on Dec. 28, 2018, in the Japan Patent Office, the entire disclosure of which is hereby incorporated by reference herein.

BACKGROUND

Technical Field

The present disclosure relates to a liquid discharge device, and a liquid discharge apparatus and a dyeing apparatus including the liquid discharge device.

Description of the Related Art

Liquid discharge apparatuses include a head (a liquid discharge head) to discharge a liquid. In some liquid discharge apparatuses, the liquid discharge head is mounted on a carriage that reciprocates to move the head back and forth between a home position for head maintenance and a discharge position at which the head discharges the liquid.

Conventionally known is a structure that includes a guide shaft that guides the carriage, a bearing provided in the carriage and fitted with the guide shaft, and a timing belt that applies, to the carriage, a driving force for moving the carriage. The timing belt is coupled to the carriage at a position above the bearing.

SUMMARY

According to an embodiment of this disclosure, a liquid discharge device includes a liquid discharge head including a nozzle face in which a nozzle is formed and configured to discharge a liquid, a carriage on which the liquid discharge head is mounted, and a guide shaft configured to hold the carriage movably. The liquid discharge device further includes a driver configured to move the carriage, and a coupling between the carriage and the driver. The coupling is disposed on an axis of the guide shaft in a direction orthogonal to the axis of the guide shaft.

According to another embodiment, a liquid discharge apparatus includes the liquid discharge device described above.

According to another embodiment, a dyeing apparatus includes the liquid discharge device described above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
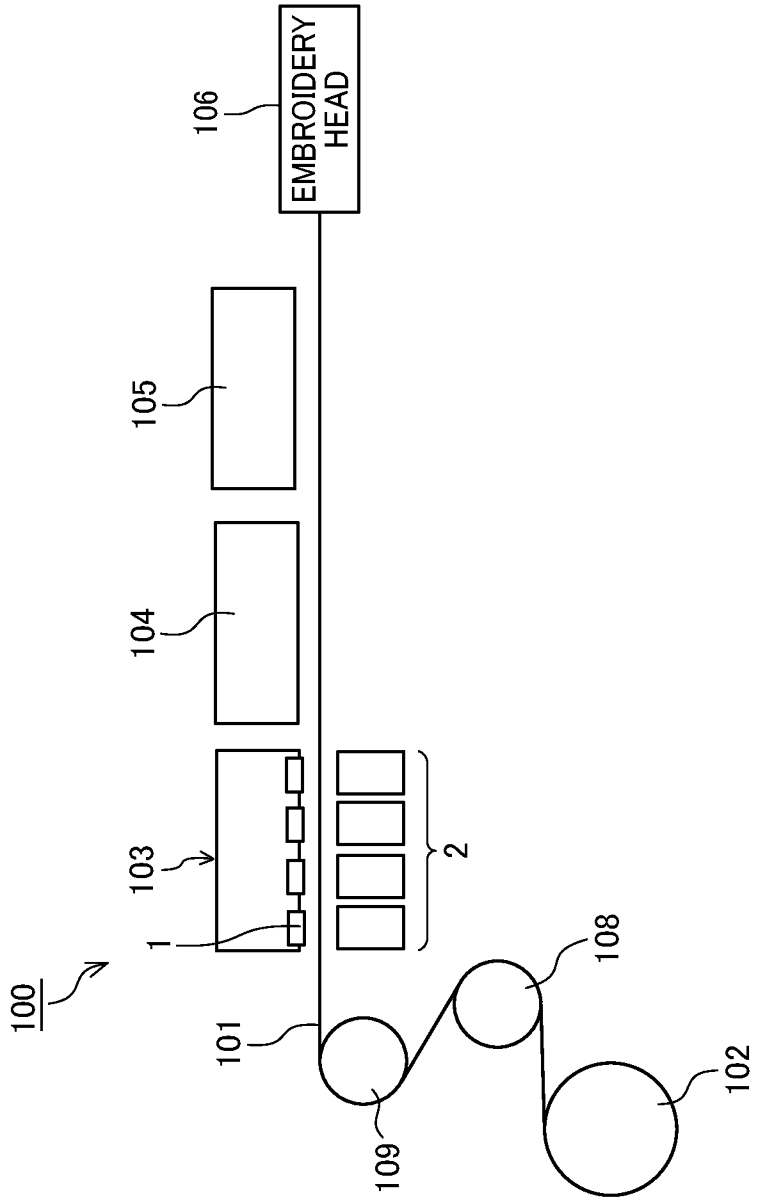
FIG. 1 is a schematic side view of a liquid discharge apparatus according to the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Figure 2:
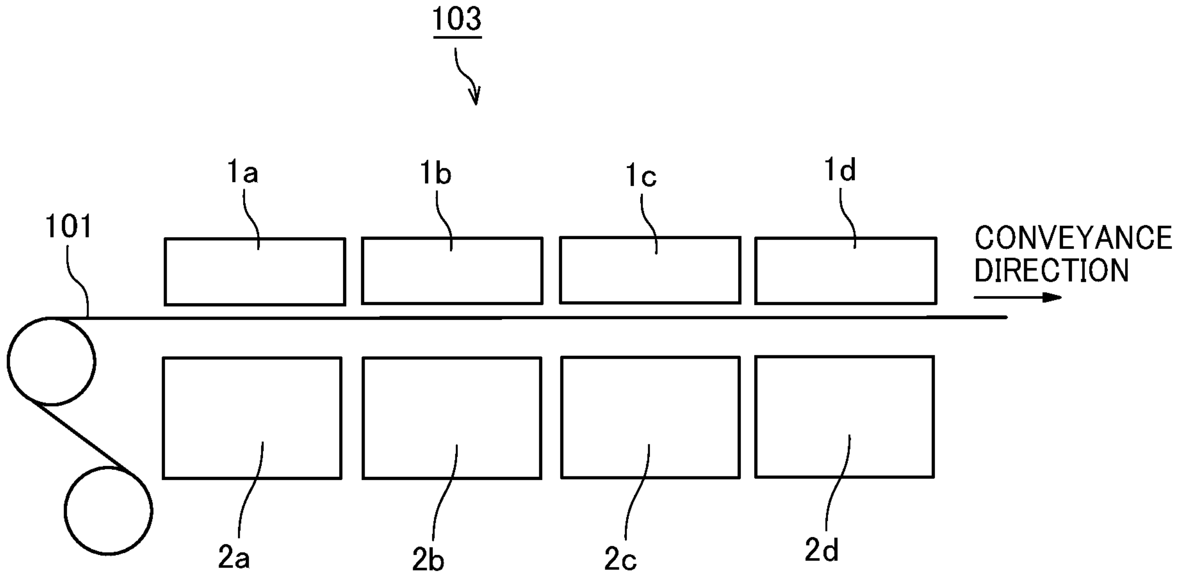
FIG. 2 is a schematic view of a liquid application unit (a liquid application device) of the liquid discharge apparatus illustrated in FIG. 1.
Figure 3:
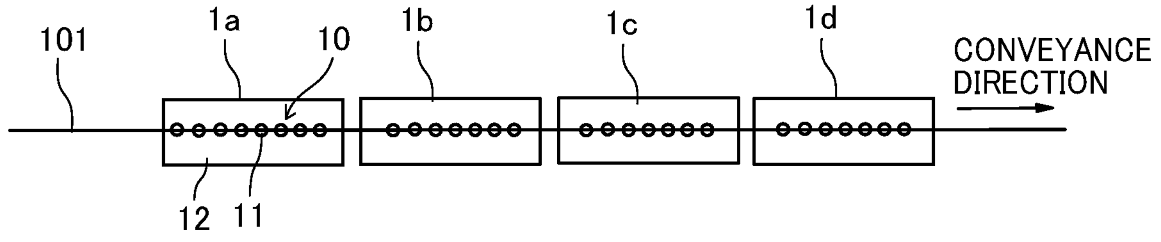
FIG. 3 is a plan view of a row of heads of the liquid application unit illustrated in FIG. 2, as viewed from below.

Referring now to the drawings, wherein like reference numerals designate identical or corresponding parts throughout the several views thereof, and particularly to FIGS. 1 to 3, a liquid discharge apparatus according to an embodiment of this disclosure is described. As used herein, the singular forms "a", "an", and "the" are intended to include the plural forms as well, unless the context clearly indicates otherwise.

FIG. 1 is a schematic view of the liquid discharge apparatus. FIG. 2 is a view of a liquid application unit of the liquid discharge apparatus. FIG. 3 is a view of a row of heads of the liquid application unit as viewed from below.

A liquid discharge apparatus 100 is an in-line embroidery machine. The liquid discharge apparatus 100 includes a supply reel 102 on which a thread 101 (a linear material, as a target of liquid application) is wound, a liquid application unit 103 (a liquid application device), a fixing unit 104, a post-processing unit 105, and an embroidery head 106.

The thread 101 drawn from the supply reel 102 is guided by rollers 108 and 109 and continuously stretched to the embroidery head 106.

The liquid application unit 103 (the liquid discharge device) includes a plurality of heads 1 (1*a* to 1*d*) and a plurality of individual maintenance units 2 (2*a* to 2*d*). The liquid application unit 103 discharges a liquid of a required color onto the thread 101 which is drawn out from the supply reel 102. The individual maintenance units 2 perform maintenance of the heads 1, respectively. The heads 1*a* to 1*d* discharge, for example, cyan (C), magenta (M), yellow (Y), and black (K) color liquids.

As illustrated in FIG. 3, each of the heads 1 (1*a* to 1*d*) includes a nozzle plate in which a plurality of nozzles 11 to discharge a liquid is formed. Specifically, on a face (hereinafter "nozzle face 12") of the nozzle plate, the plurality of nozzles 11 is lined in a nozzle row 10. Each head 1 is disposed such that the nozzle row direction (the arrangement of the nozzles 1) matches the direction of conveyance (movement direction) of the thread 101.

The fixing unit 104 performs a fixing process (drying process) of the thread 101 to which the liquid is applied from the liquid application unit 103. The fixing unit 104 includes, for example, a heater such as an infrared irradiation device and a hot air sprayer, and heats the thread 101 to dry.

The post-processing unit 105 includes, for example, a cleaning device that cleans the thread 101, a tension adjustment device that adjusts the tension of the thread 101, a feed amount detector that detects the amount of movement of the thread 101, and a lubricant application device that lubricates the surface of the thread 101.

The embroidery head 106 embroiders a pattern, for example, on a cloth with the thread 101.

Although the liquid discharge apparatus in the present embodiment is an embroidery machine, the present disclosure is not limited thereto. Aspects of the present disclosure are applicable to devices, such as weaving machines and sewing machines, that use linear objects such as threads. Further, aspects of the present disclosure can be applied not only to apparatuses having a post-process, such as an embroidery machine, but also to dyeing apparatuses and the like that dye and wind threads, etc. as described later.

Further, "thread" includes glass fiber thread, wool thread, cotton thread, synthetic thread, metal thread, wool, cotton, polymer, mixed metal thread, yarn, filament, and linear objects (continuous base materials) to which liquid is applicable. Thus, the "thread" also includes braids and flat cords (flat braids).

Figure 4:
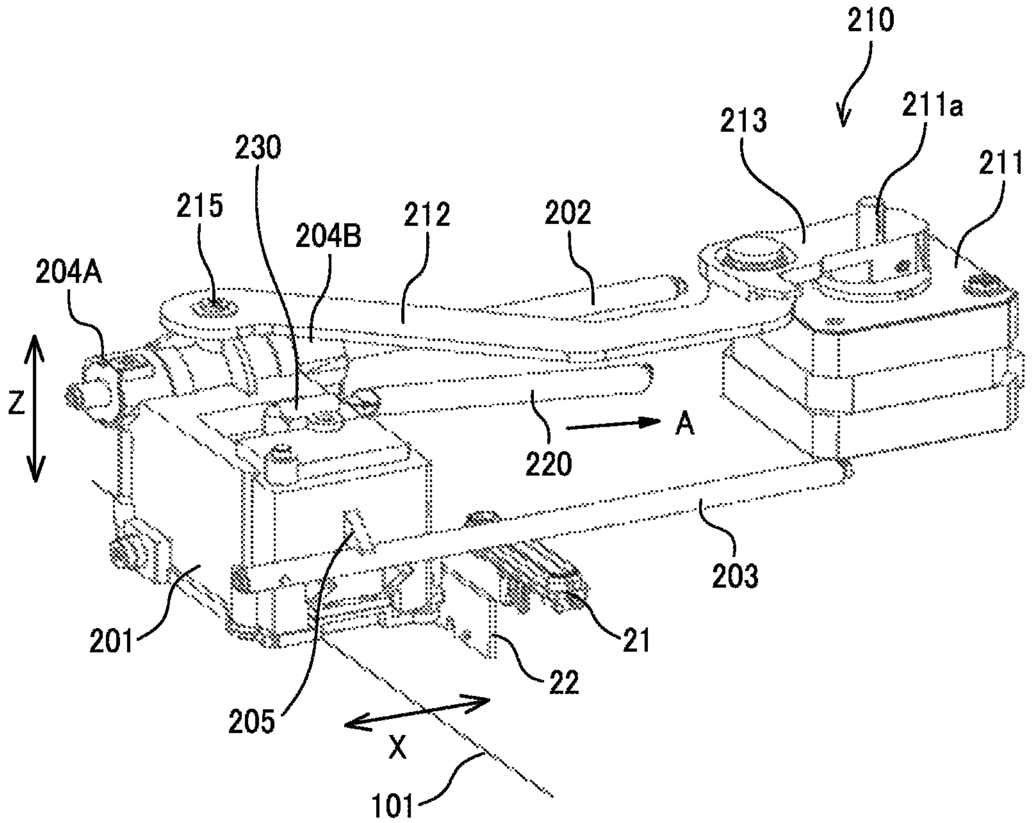
FIG. 4 is a perspective view illustrating a portion related to one head of the liquid application unit according to a first embodiment of the present disclosure.
Figure 5:
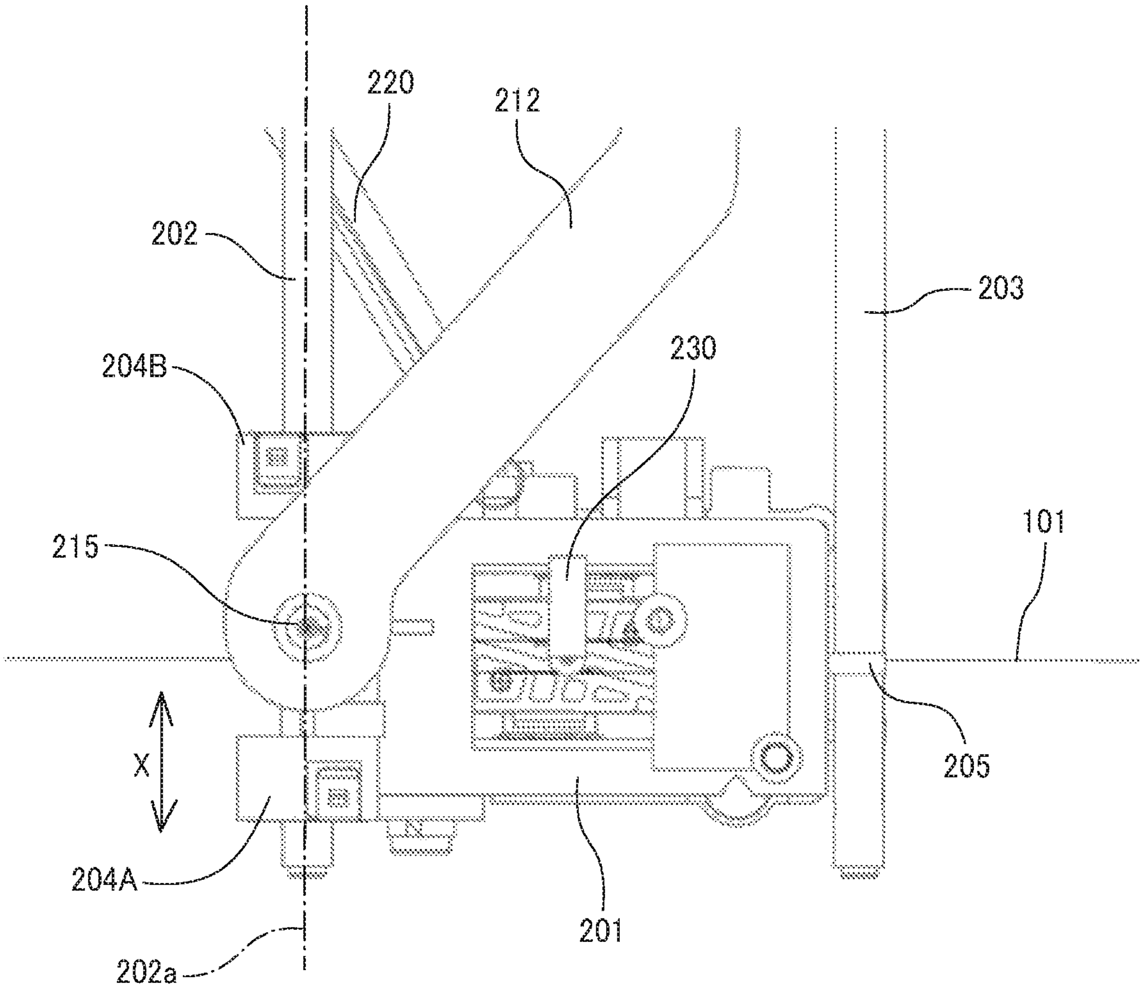
FIG. 5 is a plan view of a main part of the liquid application unit.
Figure 6:
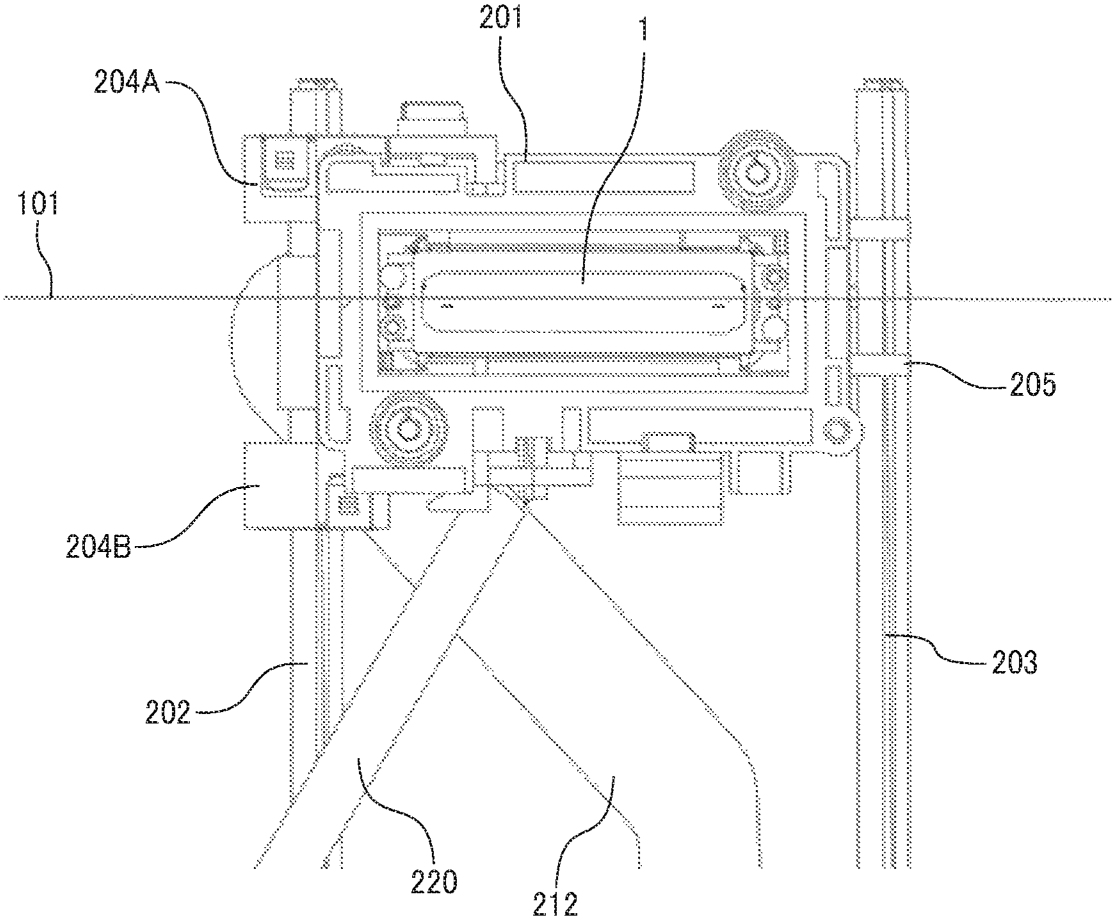
FIG. 6 is a bottom view of the main part of the liquid application unit.
Figure 7:
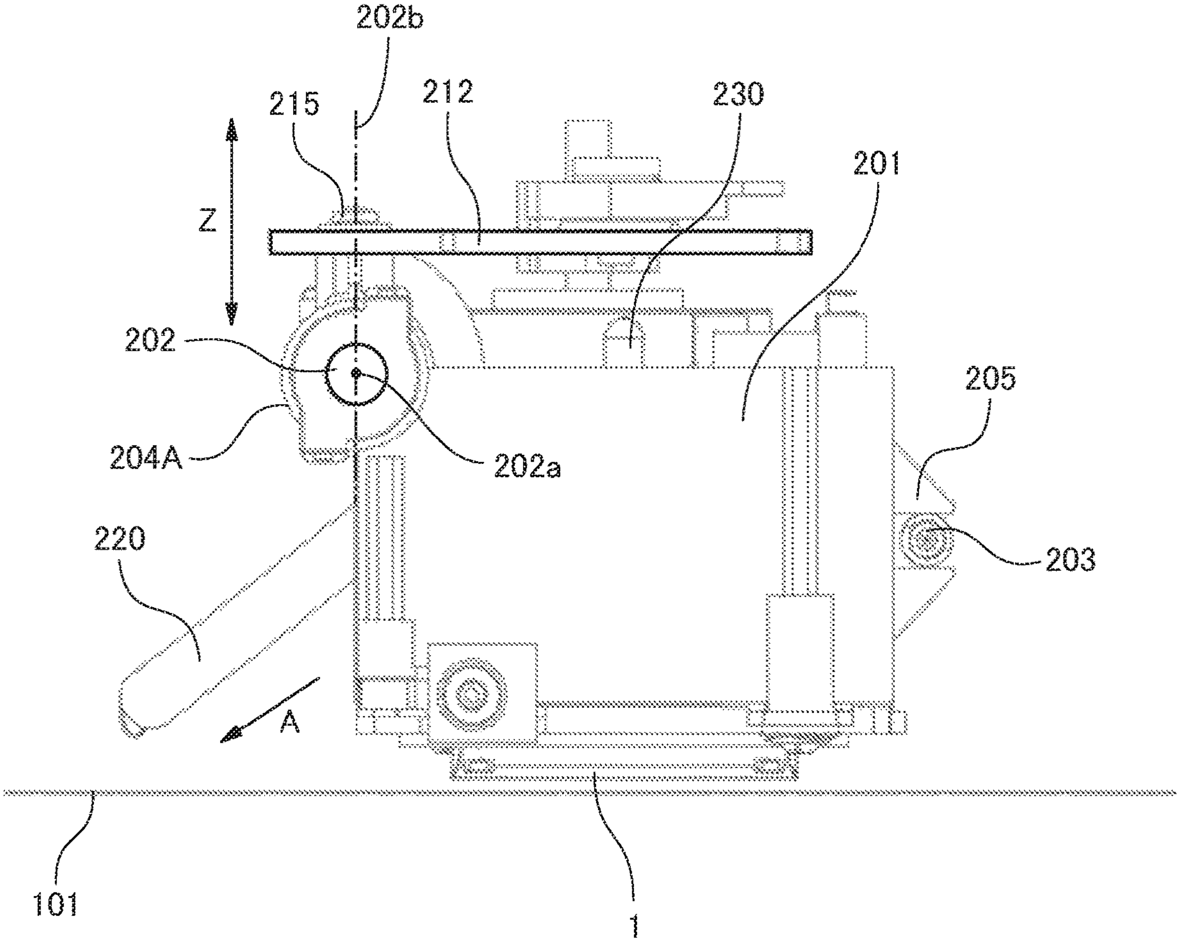
FIG. 7 is a front view of the main part of the liquid application unit.

Referring to FIGS. 4 to 7, a description is given of a first embodiment according to the present disclosure. FIG. 4 is a perspective view illustrating a portion of the liquid application unit relating to one head, according to the first embodiment. FIG. 5 is a plan view illustrating a main part of the liquid application unit. FIG. 6 is a bottom view of the main part of the liquid application unit. FIG. 7 is a front view of the main part of the liquid application unit.

The head 1 is mounted on a carriage 201 that can reciprocate in the direction indicated by arrow X, and the head 1 is moved between a home position where the head 1 is capped with the cap 21 of the individual maintenance unit 2 and a discharge position (dyeing position) where the head 1 discharges the liquid onto the thread 101. The individual maintenance unit 2 further includes, in addition to the cap 21, a wiper 22 to wipe the nozzle face 12, and the cap 21 is coupled to a suction device.

In this embodiment, the carriage 201 is held by a main guide shaft 202 and a sub-guide member 203 and reciprocally movable. The sub-guide member 203 is illustrated as a shaft in the present embodiment, but the sub-guide member 203 can be a stay or the like.

The carriage 201 includes two bearings 204 (204A and 204B) that are fitted on the main guide shaft 202 to allow the main guide shaft 202 to move. The two bearings 204A and 204B are apart from each other in the axial direction of the main guide shaft 202. The carriage 201 can be modified to include one bearing.

The carriage 201 includes protruding supports 205 that sandwich the sub-guide member 203 from above and below in FIG. 4. Alternatively, the carriage 201 can further include a bearing that fits on the sub-guide member 203 so that the sub-guide member 203 can move.

The carriage 201 is provided with a driver 210 that reciprocates the carriage 201. The driver 210 includes a motor 211 and a crank 212 that is a drive force transmission member and moved by the motor 211.

A rear end (right end in FIG. 4) of the crank 212 is rotatably attached to an arm 213 coupled to a motor shaft 211*a*. A front end (left end in FIG. 4) of the crank 212 is rotatably coupled to the carriage 201 by a support shaft 215. The support shaft 215 is a coupling between the carriage 201 and the driver 210.

As illustrated in FIGS. 5 and 7, in a direction perpendicular to an axis 202*a* of the main guide shaft 202, the coupling (the support shaft 215) between the carriage 201 and the crank 212 of the driver 210 is located on the axis 202*a* of the main guide shaft 202. Additionally, in the axial direction of the main guide shaft 202, the coupling (the support shaft 215) can located between the two bearings 204A and 204B. In other words, the coupling (the support shaft 215) can be disposed between both ends of the bearing 204A and 204B (between the left end of the bearing 204A and the right end of the bearing 204B in FIG. 4), which can be expressed "between both ends of at least one bearing".

In the present embodiment, the direction perpendicular to the axis 202*a* of the main guide shaft 202 is the vertical direction (Z direction), and the support shaft 215 is on a vertical line 202*b* (see FIG. 7) passing through the axis 202*a*. In the axial direction of the main guide shaft 202, the support shaft 215 is disposed between the two bearings 204A and 204B. Alternatively, in the structure in which one bearing is fitted on the main guide shaft 202, the support shaft 215 is disposed between the both ends of the bearing. The direction perpendicular to the axis of the main guide shaft 202 is not limited to the vertical direction.

In the present embodiment, the coupling between the carriage 201 and the crank 212 of the driver 210 is disposed at a center between the two bearings 204A and 204B.

With this structure, as the motor 211 of the driver 210 is driven, the carriage 201 reciprocates along the main guide shaft 202 and the sub-guide member 203 via the crank 212.

In order to maintain and recover the head 1, the carriage 201 is repeatedly moved between the home position where the head 1 is capped with the cap 21 and the discharge position where the thread 101 is dyed (printed) and stopped at the home position and the discharge position.

As described above, the coupling (the support shaft 215) between the crank 212 and the carriage 201 is disposed in the direction vertical to the axis 202*a* of the main guide shaft 202 and between the two bearings 204A and 204B.

This arrangement can reduce the moment that changes the posture of the head 1 (the posture of the nozzle row 10) when a force for moving the carriage 201 from the home position to the discharge position is applied. Accordingly, without reducing a clearance between the bearing 204 and the main guide shaft 202, changes in the posture of the head 1 caused by load fluctuations can be inhibited.

Therefore, the nozzle row 10 of the head 1 and the thread 101 can be aligned with each other with high accuracy, and the discharged liquid can reliably land on the thread 101.

That is, in the structure in which the head 1 that discharges the liquid directly dyes the thread 101, such as the embroidery thread, the alignment between the nozzle row 10 and the thread 101 is important to ensure that the liquid lands on the thin thread 101.

However, when the head 1 is moved from the maintenance position (home position) to the dyeing position (discharge position), the posture change of the carriage 201 at the stop is easily occurs due to the clearance between the bearing 204 of the carriage 201 and the main guide shaft 202. Therefore, the posture of the head 1 easily changes.

When the posture of the head 1 changes, the nozzle 11 deviates from the thread 101 and is likely to discharge droplets that do not land on the thread 101. Then, the thread 101 is not dyed to a desired density. If droplets of a specific color do not land on the thread 101, the color reproducibility deteriorates.

Therefore, as described above, the coupling between the carriage 201 and the driver 210 is disposed on the axis 202*a* of the main guide shaft 202 in the direction perpendicular to the axis 202*a*. Such arrangement can minimize the posture change of the head 1 when the head 1 is moved to the discharge position. Further, when the coupling is disposed between the two bearings 204A and 204B in the axial direction, the posture change of the head 1 can be further reduced.

As a result, the misalignment between the nozzle row 10 of the head 1 and the thread 101 is reduced, and the droplet can land on the thread 101 with higher accuracy. Thus, efficient dyeing and high color reproduction can be obtained.

Figure 8:
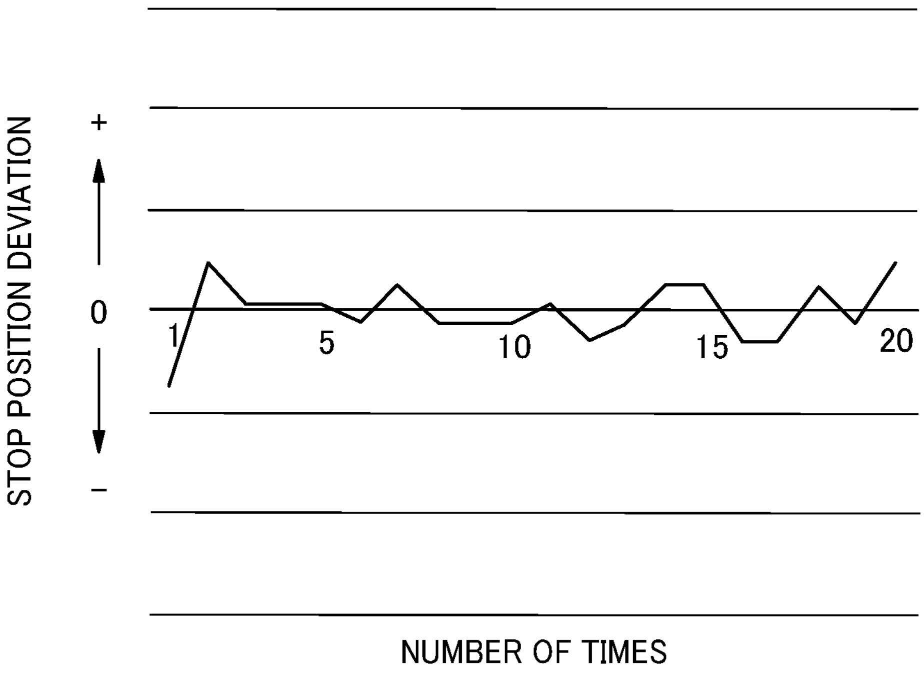
FIG. 8 is a chart of an example of a measurement result of positional deviation of a carriage according to an embodiment.
Figure 9:
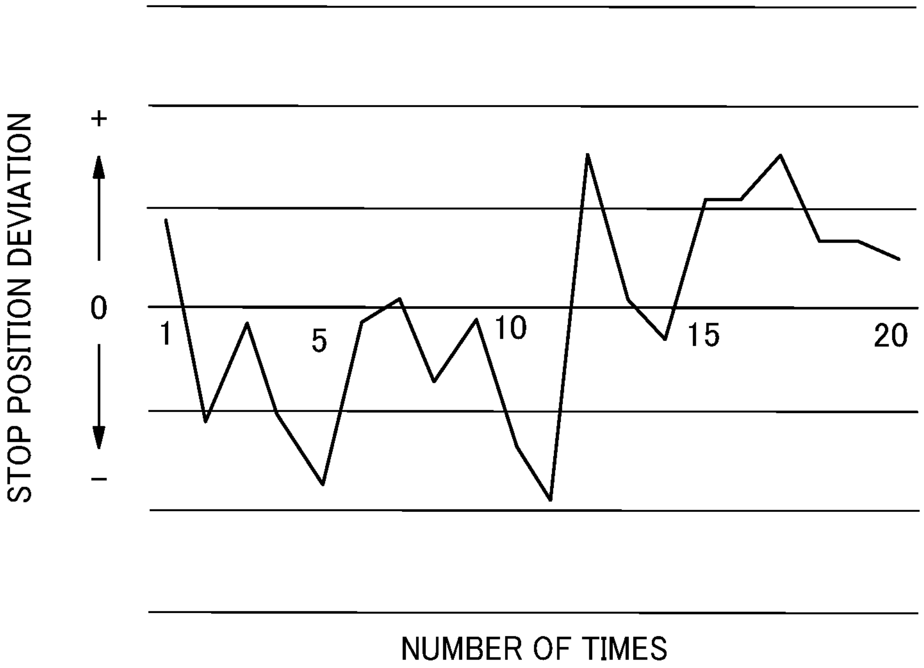
FIG. 9 is a chart of an example of a measurement result of positional deviation of a carriage according to a comparative example.

Next, a configuration to apply pressure to the carriage 201 will be described with reference to FIGS. 8 and 9. FIG. 8 is a chart of an example of measurement result of positional deviation of the carriage according to the present embodiment. FIG. 9 is a chart of an example of measurement result of positional deviation of a carriage according to a comparative example.

A tension coil spring 220, which is an elastic member, is disposed between the carriage 201 and a fixed portion (e.g., a housing of the liquid application unit 103). When viewed from the main guide shaft 202, the tension coil spring 220 is coupled to the carriage 201 at a position apart from a connection to the carriage 201 of the supply tube 230 that supplies the liquid to the head 1.

Pulling, with the tension coil spring 220, the carriage 201 in the direction heading to the home position from the discharge position can minimize changes in the posture due to a backlash of a mechanism such as the coupling between the crank 212 and the carriage 201 and fluctuations in load of the supply tube 230.

Further, the tension coil spring 220 is disposed so as to pull the carriage 201 obliquely downward (in the direction indicated by arrow A illustrated in FIGS. 4 and 7) with respect to the axis 202*a* of the main guide shaft 202.

As a result, the protruding support 205 of the carriage 201 is pressed against the sub-guide member 203 from above, and the contact between the protruding support 205 and the sub-guide member 203 is secured.

Further, when the direction of the force transmitted from the crank 212 in moving the carriage 201 from the home position to the discharge position coincides with the direction of the force of the tension coil spring 220, the following advantage is available. Variations in the posture of the carriage 201 caused by the clearance between the bearings 204 and the main guide shaft 202 are minimized.

The carriage 201 according to the present embodiment was moved and stopped a plurality of times, and deviations of the actual stop position from a target stop position were measured. FIG. 8 illustrates the result of measurement. As a comparative example, using a carriage 201 without the tension coil spring 220, deviations of the actual stop position from the target stop position were measured similarly. FIG. 9 illustrates the result of measurement.

According to such measurement results, providing the tension coil spring 220 can reduce the stop position deviations of the carriage 201, thereby inhibiting changes in the posture.

Figure 10:
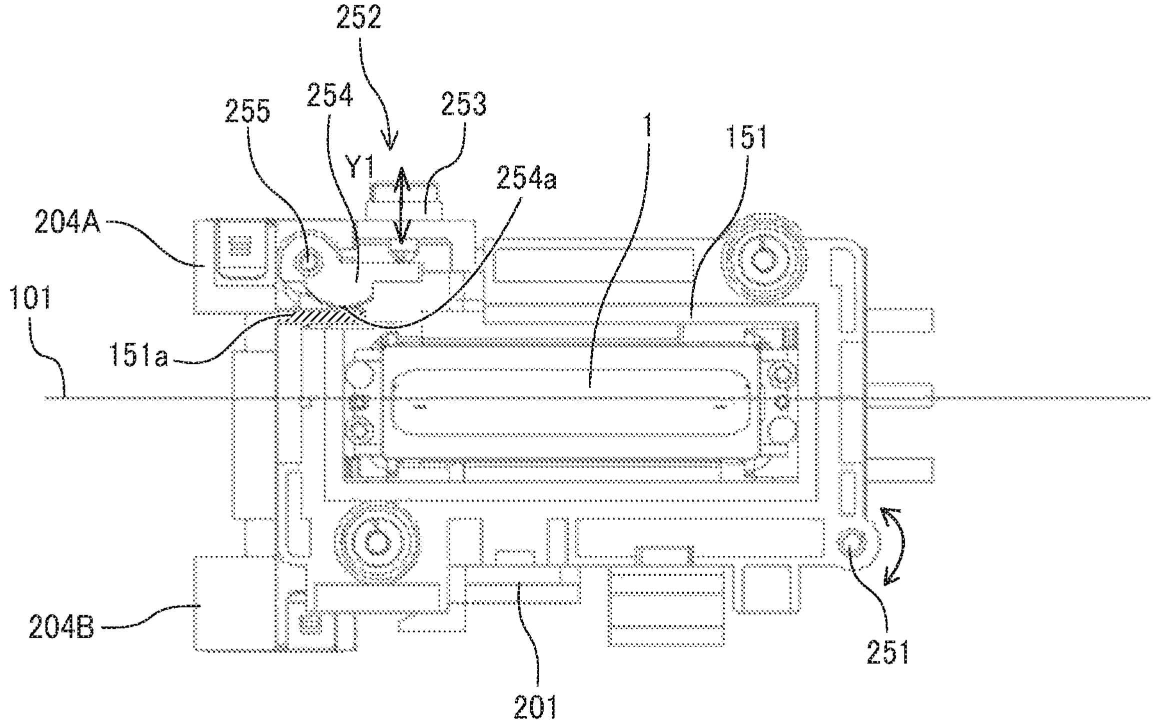
FIG. 10 is a bottom view of a carriage according to a second embodiment of the present disclosure.

Next, a second embodiment of the present disclosure is described with reference to FIG. 10. FIG. 10 is a bottom view of a carriage according to the second embodiment.

The head 1 is attached to a head holder 151, and the head holder 151 is supported on the carriage 201. One corner of the head holder 151 is held rotatably on the carriage 201 by a support shaft 251. Accordingly, the head 1 held on the carriage 201 can rotate in the in-plane direction of the nozzle face 12.

The head 1 is provided with an adjuster 252 to adjust the angle at which the nozzle row 10 of the head 1 crosses the axis 202*a* of the main guide shaft 202.

The adjuster 252 includes an adjusting screw 253, serving as an operated member, and a lever 254, serving as a transmission member. The adjusting screw 253 is attached to the carriage 201 and moves forward and backward in the direction indicated by arrow Y1. The lever 254 is moved by the adjusting screw 253 and rotates the head 1 with a displacement amount smaller than the displacement amount of the adjusting screw 253.

The lever 254 is rotatably supported on the carriage 201 with a support shaft 255 and includes a curved bulge 254*a* that contacts a contact part 151*a* of the head holder 151.

As the adjusting screw 253 of the adjuster 252 is rotated (operated), the adjusting screw 253 pushes and rotates the lever 254. Then, the bulge 254*a* of the lever 254 presses the contact part 151*a* of the head holder 151, thereby rotating the head holder 151 about the support shaft 251 as a fulcrum, and the head 1 rotates.

At this time, since the displacement of the adjusting screw 253 is converted into the rotation of the lever 254, the displacement amount of the adjusting screw 253 transmitted to the head holder 151 can be reduced. Therefore, the crossing angle of the nozzle row 10 can be adjusted with a high accuracy.

As a result, the nozzle row 10 of the head 1 can be aligned with the direction along the thread 101, and liquid can land on the thread 101 with high accuracy, thereby improving the color reproducibility.

Figure 11:
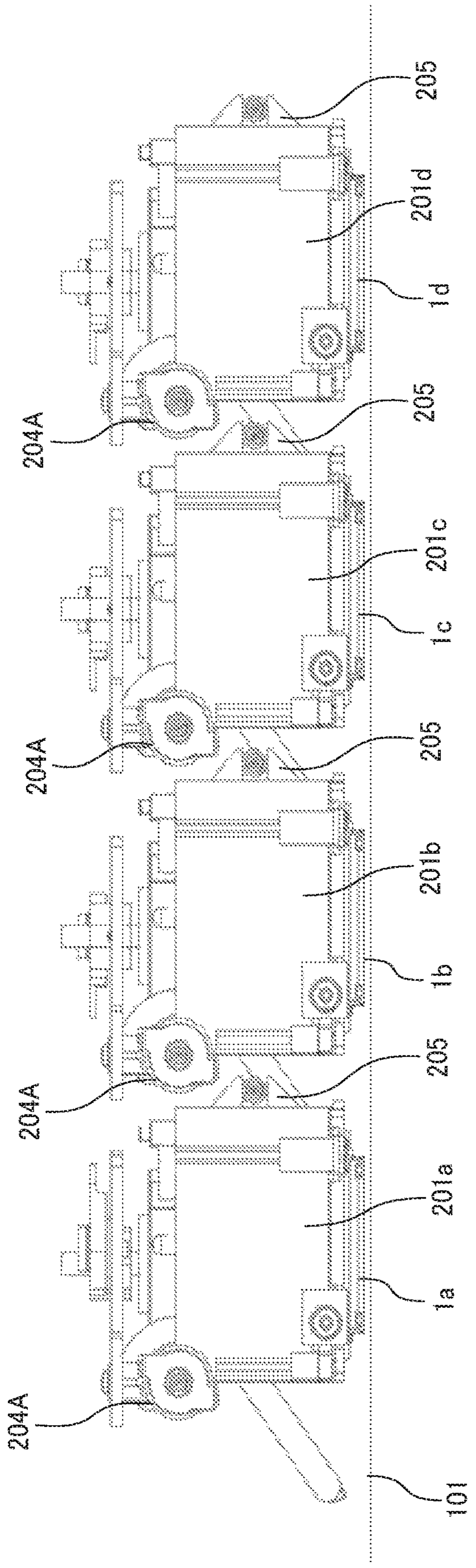
FIG. 11 is a front view of a liquid application unit according to a third embodiment of the present disclosure.

Next, a third embodiment of the present disclosure is described with reference to FIG. 11. FIG. 11 is a front view of the liquid application unit 103 according to the third embodiment.

As described above, in the liquid application unit 103, the four heads 1 are arranged in the nozzle arrangement direction along the conveyance direction indicated of the thread 101. Therefore, the four carriages 201 (201*a* to 201*d*) on which the heads 1 (1*a* to 1*d*) are respectively mounted are arranged along the conveyance direction of the thread 101.

In the conveyance direction of the thread 101, the bearings 204A and 204B (see FIG. 4) that fit around the main guide shaft 202 are disposed at one end of the carriage 201, and the protruding supports 205 that engage with the sub-guide member 203 are disposed at the other end of the carriage 201. The bearings 204 and the protruding supports 205 are apart from each other in the height direction in FIG. 11.

With this placement, in the plurality of carriages 201 arranged in the conveyance direction of the thread 101, the bearings 204 of one carriage 201 are inhibited from interfering with the protruding supports 205 of the adjacent carriage 201. Accordingly, the arrangement length of the plurality of carriages 201 can be shortened.

Figure 12:
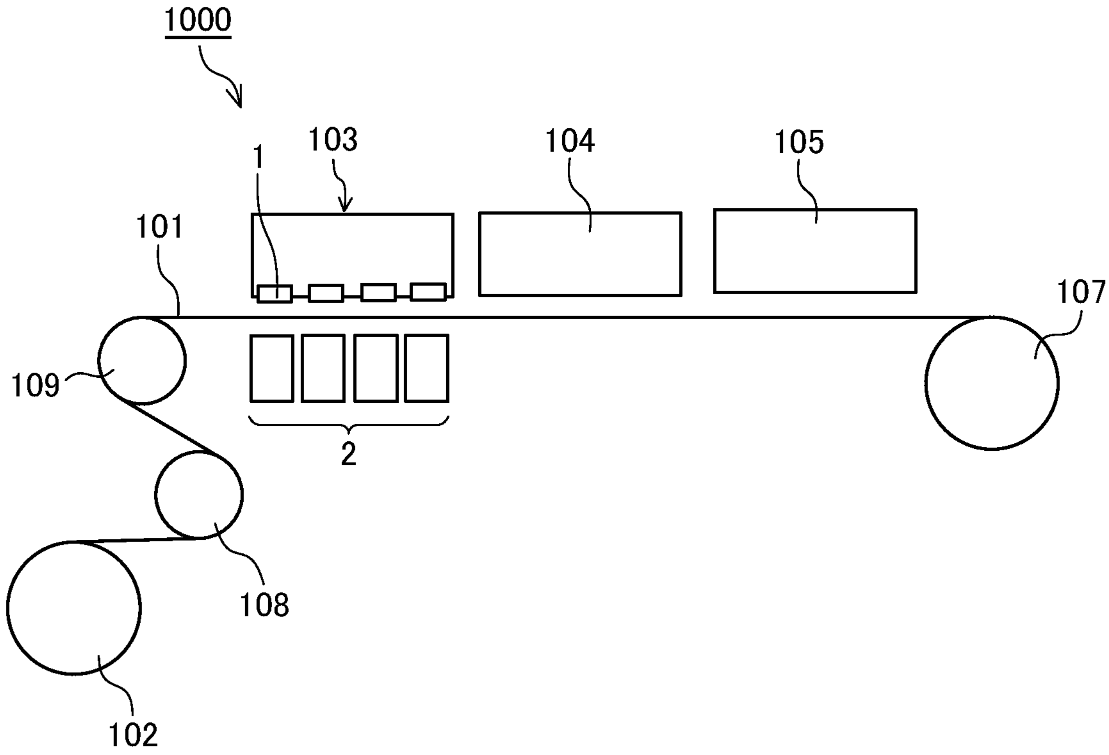
FIG. 12 is a schematic view of a dyeing apparatus according to an embodiment of the present disclosure.

A description is given below of a dyeing apparatus according to an embodiment of the present disclosure, with reference to FIG. 12. FIG. 12 is a schematic view of the dyeing apparatus.

In a dyeing apparatus 1000, the embroidery head 106 in the liquid discharge apparatus 100 is replaced with a take-up reel 107 for winding the thread 101 after dyeing.

The dyeing apparatus 1000 supplies the thread 101 from the supply reel 102, discharges a liquid of a required color from the liquid application unit 103, dyes the thread 101 into a target color, and winds the dyed thread 101 with the take-up reel 107.

In the present disclosure, "liquid" discharged from a liquid discharge head is not particularly limited as long as the liquid has a viscosity and surface tension of degrees dischargeable from the liquid discharge head. Examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as deoxyribonucleic acid (DNA), amino acid, protein, or calcium, or an edible material, such as a natural colorant.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. A liquid discharge apparatus comprising:
- a liquid discharge head including a nozzle face in which a nozzle is formed and configured to discharge a liquid;
- a carriage on which the liquid discharge head is mounted;
- a guide shaft to hold the carriage movably;
- at least one bearing in which the guide shaft is movably fitted;
- a driver to move the carriage, the driver including a crank coupled to the carriage; and
- a coupling between the carriage and the crank, the coupling disposed on an axis of the guide shaft in a direction orthogonal to the axis of the guide shaft,
- wherein, in an axial direction of the guide shaft, the coupling is disposed between both ends of the at least one bearing, or the at least one bearing includes two bearings and the coupling is disposed between the two bearings in the axial direction of the guide shaft, and
- the liquid discharge apparatus further comprises an elastic structure disposed between the carriage and a fixed portion of the liquid discharge apparatus, the elastic structure being disposed to pull the carriage obliquely downward with respect to the axis of the guide shaft.

2. The liquid discharge apparatus according to claim 1,
- wherein the coupling is disposed at a center between the two bearings.

3. The liquid discharge apparatus according to claim 1, further comprising a supply tube through which the liquid is supplied to the liquid discharge head on the carriage,
- wherein the elastic structure is connected to the carriage at a position separated from a connection between the carriage and the supply tube.

4. The liquid discharge apparatus according to claim 1,
- wherein the carriage is configured to hold the liquid discharge head to rotate in an in-plane direction of the nozzle face, and
- wherein the liquid discharge apparatus further includes an adjuster to adjust an angle at which the liquid discharge head crosses the axis of the guide shaft, the adjuster including:
  - an operated structure to be operated; and
  - a transmission structure moved by the operated structure to rotate the liquid discharge head with a displacement amount smaller than a displacement amount of the operated structure.

5. The liquid discharge apparatus according to claim 2, further comprising a supply tube through which the liquid is supplied to the liquid discharge head on the carriage,
- wherein the elastic structure is connected to the carriage at a position separated from a connection between the carriage and the supply tube.

6. The liquid discharge apparatus according to claim 2,
- wherein the carriage is configured to hold the liquid discharge head to rotate in an in-plane direction of the nozzle face, and
- wherein the liquid discharge apparatus further includes an adjuster to adjust an angle at which the liquid discharge head crosses the axis of the guide shaft, the adjuster including:
  - an operated structure to be operated; and
  - a transmission structure moved by the operated structure to rotate the liquid discharge head with a displacement amount smaller than a displacement amount of the operated structure.

7. A liquid discharge device comprising
- a liquid discharge head including a nozzle face in which a nozzle is formed and configured to discharge a liquid;
- a carriage on which the liquid discharge head is mounted;
- a guide shaft configured to hold the carriage movably;
- at least one bearing in which the guide shaft is movably fitted;
- a driver to move the carriage, the driver including a crank coupled to the carriage; and
- a coupling between the carriage and the crank, the coupling disposed on an axis of the guide shaft in a direction orthogonal to the axis of the guide shaft,
- wherein, in an axial direction of the guide shaft, the coupling is disposed between both ends of the at least one bearing, or the at least one bearing includes two bearings and the coupling is disposed between the two bearings in the axial direction of the guide shaft, and
- the liquid discharge apparatus further comprises an elastic structure disposed between the carriage and a fixed portion of the liquid discharge apparatus, the elastic structure being disposed to pull the carriage obliquely downward with respect to the axis of the guide shaft.

8. A dyeing apparatus comprising
- a liquid discharge head including a nozzle face in which a nozzle is formed and configured to discharge a liquid;
- a carriage on which the liquid discharge head is mounted;
- a guide shaft to hold the carriage movably;
- at least one bearing in which the guide shaft is movably fitted;
- a driver to move the carriage, the driver including a crank coupled to the carriage; and
- a coupling between the carriage and the crank, the coupling disposed on an axis of the guide shaft in a direction orthogonal to the axis of the guide shaft, wherein, in an axial direction of the guide shaft, the coupling is disposed between both ends of the at least one bearing, or the at least one bearing includes two bearings and the coupling is disposed between the two bearings in the axial direction of the guide shaft, and the liquid discharge apparatus further comprises an elastic structure disposed between the carriage and a fixed portion of the liquid discharge apparatus, the elastic structure being disposed to pull the carriage obliquely downward with respect to the axis of the guide shaft.

* * * * *